United States Patent [19]

Persson

[11] 4,316,553

[45] Feb. 23, 1982

[54] AUTOMATIC LOTTERY TICKET VENDING MACHINE

[76] Inventor: Frans-Erik Persson, Vargatan 17, Lomma, Sweden, 234 00

[21] Appl. No.: 112,785

[22] Filed: Jan. 16, 1980

[30] Foreign Application Priority Data

Jan. 17, 1979 [SE] Sweden ................................ 7900407

[51] Int. Cl.[3] ................................................ B23Q 7/12

[52] U.S. Cl. .................................... 221/167; 221/182; 221/186; 221/197

[58] Field of Search .................. 221/197, 186, 187, 82, 221/203, 182, 167, 263, 266; 273/144 R, 144 A, 144 B; 133/8 A, 3 H; 194/DIG. 8; 198/392

[56] References Cited

U.S. PATENT DOCUMENTS 1,250,179 12/1917 Hughes et al. .
1,979,043 10/1934 McCullough .
2,234,868 3/1941 Laudien .
2,710,714 6/1955 Worth ................................ 221/197 X
2,731,268 1/1956 Raizen ................................ 221/187 X

*Primary Examiner*—Allen N. Knowles
*Attorney, Agent, or Firm*—John J. Dennemeyer

[57] ABSTRACT

Improvements in automatic lottery ticket vending machines adapted upon lottery ticket purchase to dispense one or a definite number of tickets at a time from an externally inaccessible portion of the interior of the vending machine.

For the purpose of facilitating loading of the automatic lottery ticket vending machine so that the loading can be effected safer and at a more rapid rate, as well as to simplify the construction of the vending machines, the invention comprises at least one transport container for the tickets detachably connected to rotation means forming part of the automatic vending machine and adapted to rotate the container as a unit for mixing and dispensing the tickets.

10 Claims, 5 Drawing Figures

AUTOMATIC LOTTERY TICKET VENDING MACHINE

The present invention relates to improvements in automatic lottery ticket vending machines of the kind which, upon ticket purchase, enable dispensing of one or a definite number of tickets at a time from a part of the interior of the machine which is inaccessible from outside.

Previously known lottery ticket vending machines are loaded, for instance by the measures of opening the ticket package or container and dumping the loose tickets into a space within the machine from which space they can be dispensed by the aid of a dispensing mechanism. There has been found to be a risk that, upon loading the vending machine, tickets will happen to drop down outside the vending machine, or into the machine but externally of the space intended for them. It has also been found difficult to construct the machine in such a way that unauthorized dispensing of lottery tickets, for instance by inclining the machine, can be completely eliminated.

It is an object of the present invention to avoid these and other drawbacks of the vending machine mentioned in the opening paragraph. According to the invention this object is mainly achieved by the fact that at least one container package for transportation of the lottery tickets is releasably connected to rotating means forming part of the vending machine and adapted to rotate the container as a unit for mixing and dispensing the lottery tickets. By the use of this arrangement, the operation of loading the machine is facilitated in several respects, i.e. the loading operation will not only become safer, but it can also be carried out more rapidly than before. In addition, the interior of the machine need not be equipped with a special lottery ticket magazine, and also not with any ticket mixing arrangement.

The invention will be described more closely hereinafter with reference to the accompanying drawings, in which.

Figure 1:
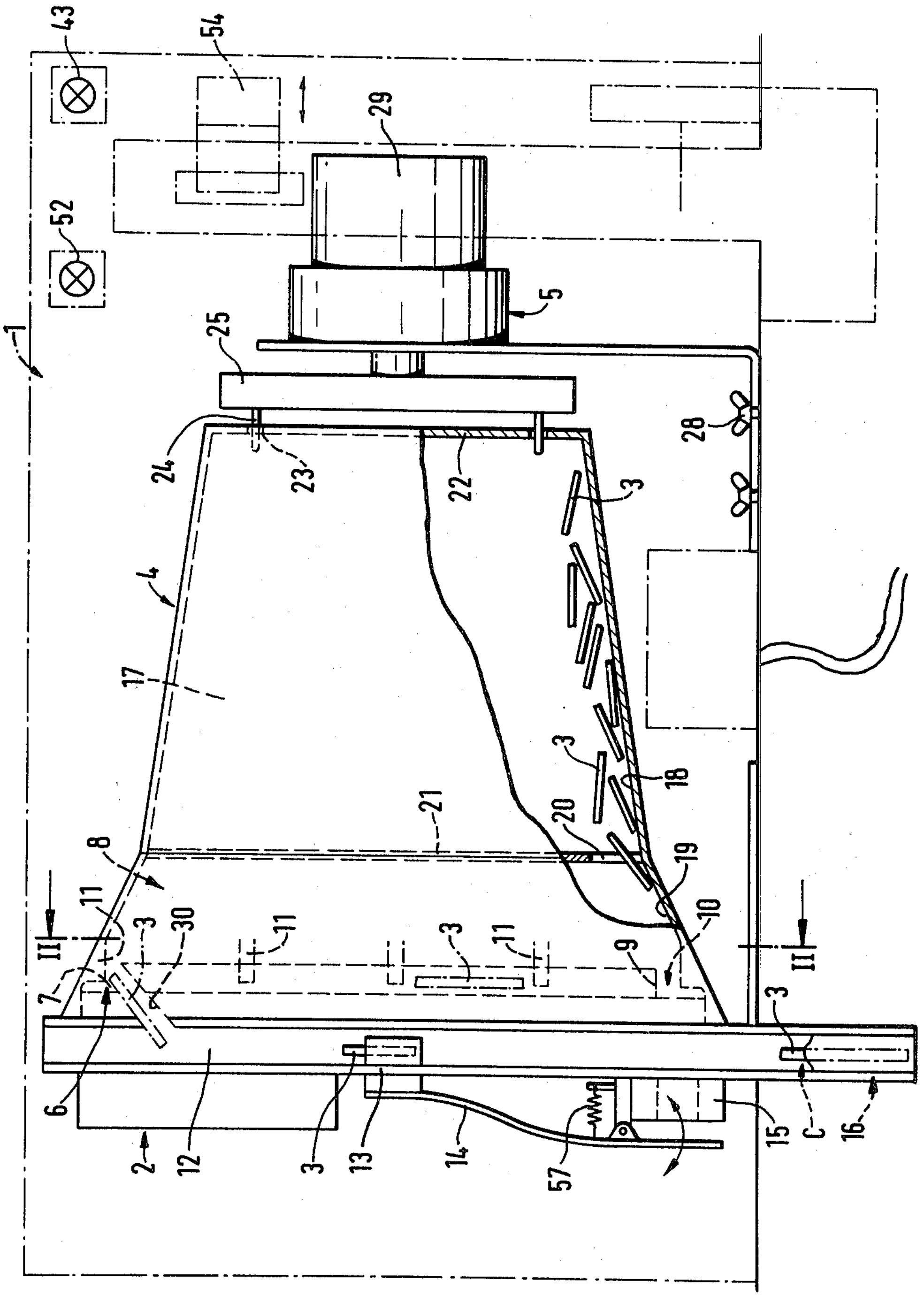
FIG. 1 is a side view of an automatic lottery ticket vending machine according to the invention.
Figure 2:
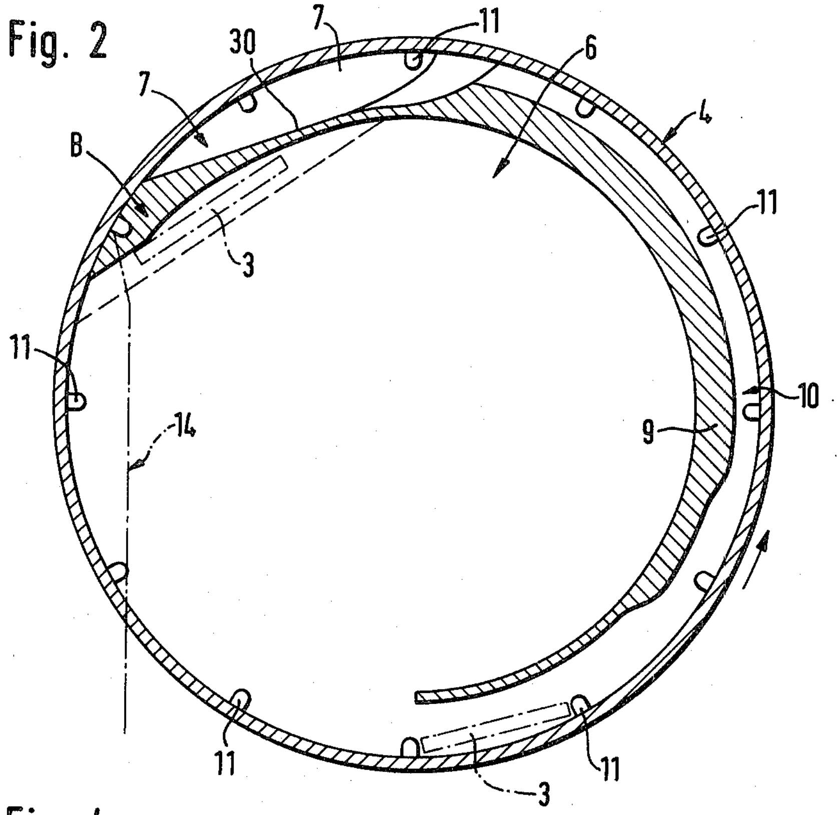
FIG. 2 is a section taken along the line II—II in FIG. 1.
Figure 4:
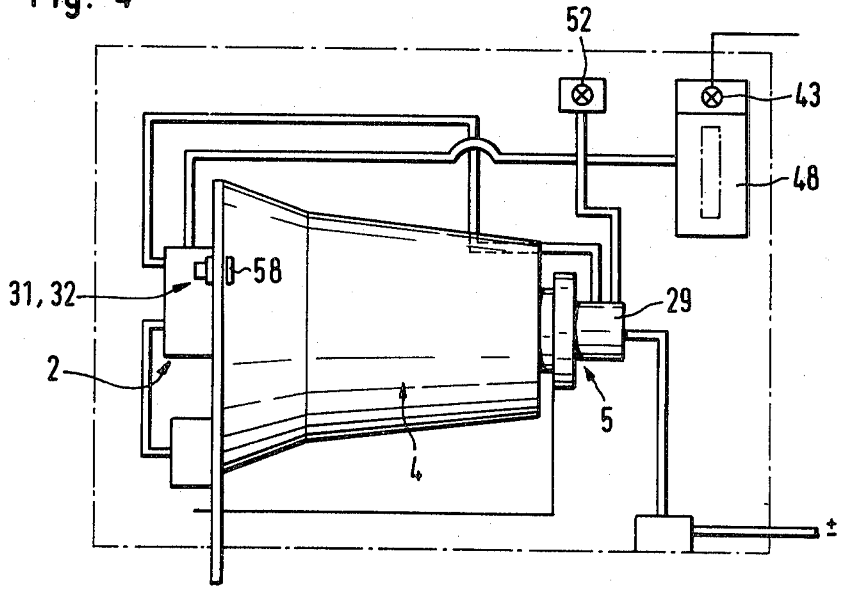
FIG. 4 is a diagrammatic illustration of an electrical dispensing system incorporated in the machine.
Figure 3:
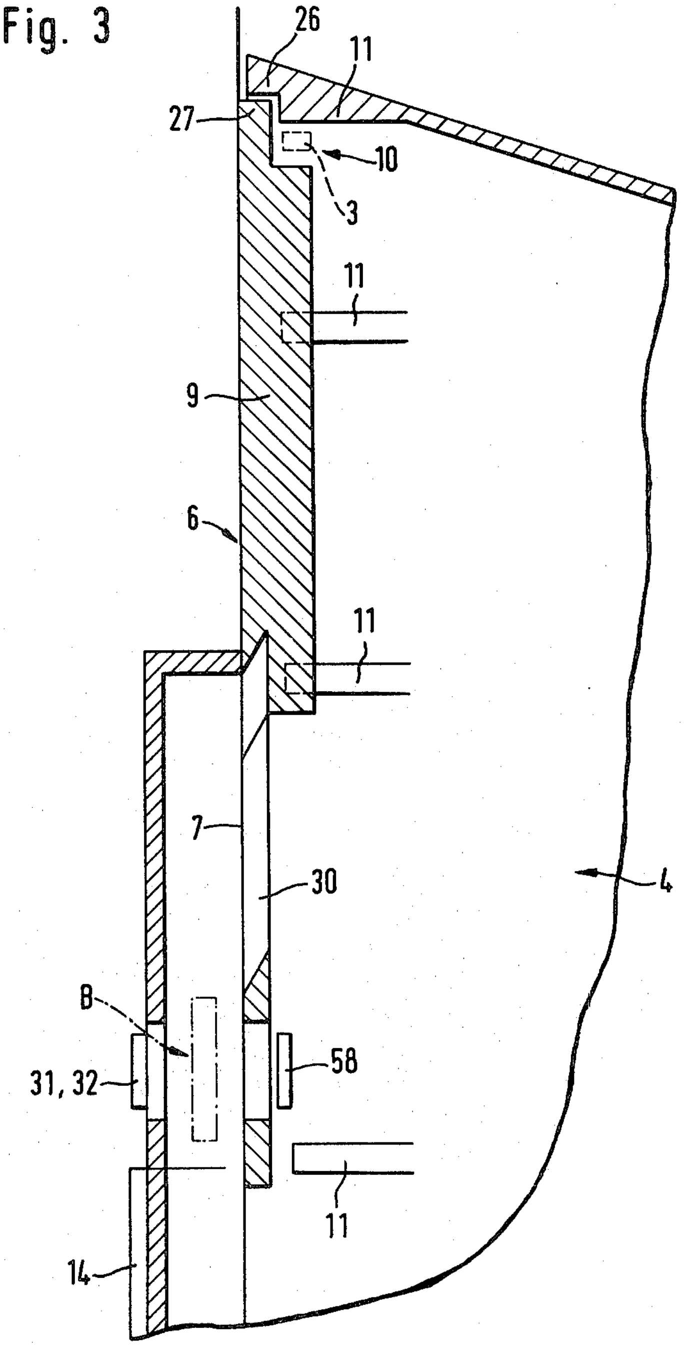
FIG. 3 shows a portion of a dispensing channel forming part of the machine.

The automatic lottery ticket vending machine illustrated comprises a casing 1 diagrammatically shown in dot-and-dash lines. The casing 1 is so disposed as to be easily accessible to lottery ticket buyers, for instance on the top of a table, and containes within it dispensing means 2 adapted upon ticket purchases to dispense a ticket or a definite number of tickets 3 from the vending machine. The casing 1 is lockable or provided with a lockable door to enable the tickets 3 to be locked up within the machine.

In order to essentially facilitate the loading of this automatic vending machine with lottery tickets 3, to facilitate dispensing of the latter very extensively, to prevent unauthorized discharge of tickets, and, in addition, to enable a continuous mixing of the tickets within the apparatus, in principle, a container 4 for transportation of the tickets into the vending machine is detachably connected to rotating means 5 forming part of the vending machine and adapted to rotate the container 4 as a unit.

In order to facilitate mounting of the container 4 within the apparatus, to ascertain efficient guiding of its rotary movement, and to eliminate any risk of unauthorized removal of tickets in a particularly efficient way, the container 4 cooperates with a guiding member 6 which is adapted to guide one end portion of the container 4 and which has an opening 7 through which a lottery ticket 3 or a definite number of tickets 3 can issue from the interior of the container 4.

The container basically comprises a ticket driving portion 8 forming together with a ticket guiding part 9 comprised in the guiding member 6 a separation path 10 for the tickets 3, which separation path 10 allows one or a definite number of tickets 3 at a time to reach the opening 7 of the guiding member 6. The ticket driving portion 8 of the container 4 has at least one driver element 11 which can move through the separation path 10 during the rotation of the container 4, thereby carrying with it one or a definite number of tickets 3 at a time to the opening 7 of the guiding member 6. Accordingly, it has been arranged by very simple means that single tickets or a given plurality of tickets at a time can be dispensed from the container 4.

In order that the arrangement forming the path of movement of the lottery tickets shall be simple, and the dispensing shall be rapid and safe upon a purchase being made, the guiding member 6 is associated with a dispensing path 12 forming parts 13 for guiding the tickets 3 after their passage through the opening 7 and the dispensing path 12 is engaged by a catch 14 adapted to hold a ticket 3 or a definite number of tickets 3 at a time in a position B of readiness, and which when actuated by control means 15 actuated upon purchase of a lottery ticket 3, will release the ticket or tickets 3 in the preparedness position B to dispense this ticket or tickets 3 from the automatic vending machine. The ticket 3 dispensed will take up a particularly easily accessible position C owing to the fact that the parts 13 forming the dispensing path 12 will form a pocket 16 accessible for taking out the tickets(s) 3 and in which the ticket 3 to be dispensed will take up a position C inclined upwards and towards the buyer.

The storage container 4 has the function of a very easily sealable and very efficient ticket dispenser by being divided into a ticket containing, sealable ticket storage magazine 17 adjacent to the ticket driving portion 8 and which, by breaking a seal, can be caused to communicate with the ticket magazine 17 so that, upon rotation of the storage container 4, tickets will be able to move into the ticket driving portion 8. Efficient feeding of the tickets 3 through the container 4 is simply effected by the expedient that the container 4 has sloping inner walls 18 and 19, whereby the tickets cannot remain in their positions when the storage container 4 is rotated, but will slide towards the guiding member 6. This sliding movement will be specifically balanced, i.e. the tickets will slide faster within the ticket driving portion 8 than within the ticket magazine 17, owing to the fact that the walls 19 of the ticket driving portion 8 are more inclined than the walls 18 of the ticket storage magazine 17. Tickets 3, accordingly, will slide out from the ticket magazine 17 from time to time through one or more apertures 20 in a partition 21, after which they will rapidly slide down on the walls 19 towards the guiding member 6.

To load the automatic vending machine, a sealed container 4 containing a definite number of tickets 3 is selected. The container 4 is opened by removing the seal (not shown) closing the apertures 20. Thereafter the casing 1 of the machine is opened and the empty storage container 4, if any, is removed. The ticket containing storage container 4 is connected to the rotating means 5 and for that purpose has a bottom wall 22 with perforations 23 for the reception of pins 24 projecting from the rotating portions 25 of the rotating means 5. Upon the storage container 4 having been connected to the rotating means 5, the latter is displaced towards the guiding member 6 until a reinforced end edge 26 surrounds a guiding edge 27 of the guiding member 6. Then the rotating means 5 is secured in its position by screws 28 or the like, whereby the storage container 4 is fixed into its proper functioning position in the apparatus.

By starting the motor 29 of the rotating means 5 the storage container 4 is rotated, and the lottery ticket 3 is moved forward by the driver elements 11 to be fed into the separation path 10. The latter is tapering so that all but one ticket 3 will fall back downward, while one ticket 3 is carried on upwardly until it reaches an inclined edge 30 which forms the bottom edge of the opening 7 through which the ticket 3 will leave the container 4 and will slide in the dispensing path 12 down to the position of preparedness, B. From this position, the ticket 3 is allowed, upon a ticket purchase being made, to slide further downward and out from the automatic vending machine.

Figure 5:
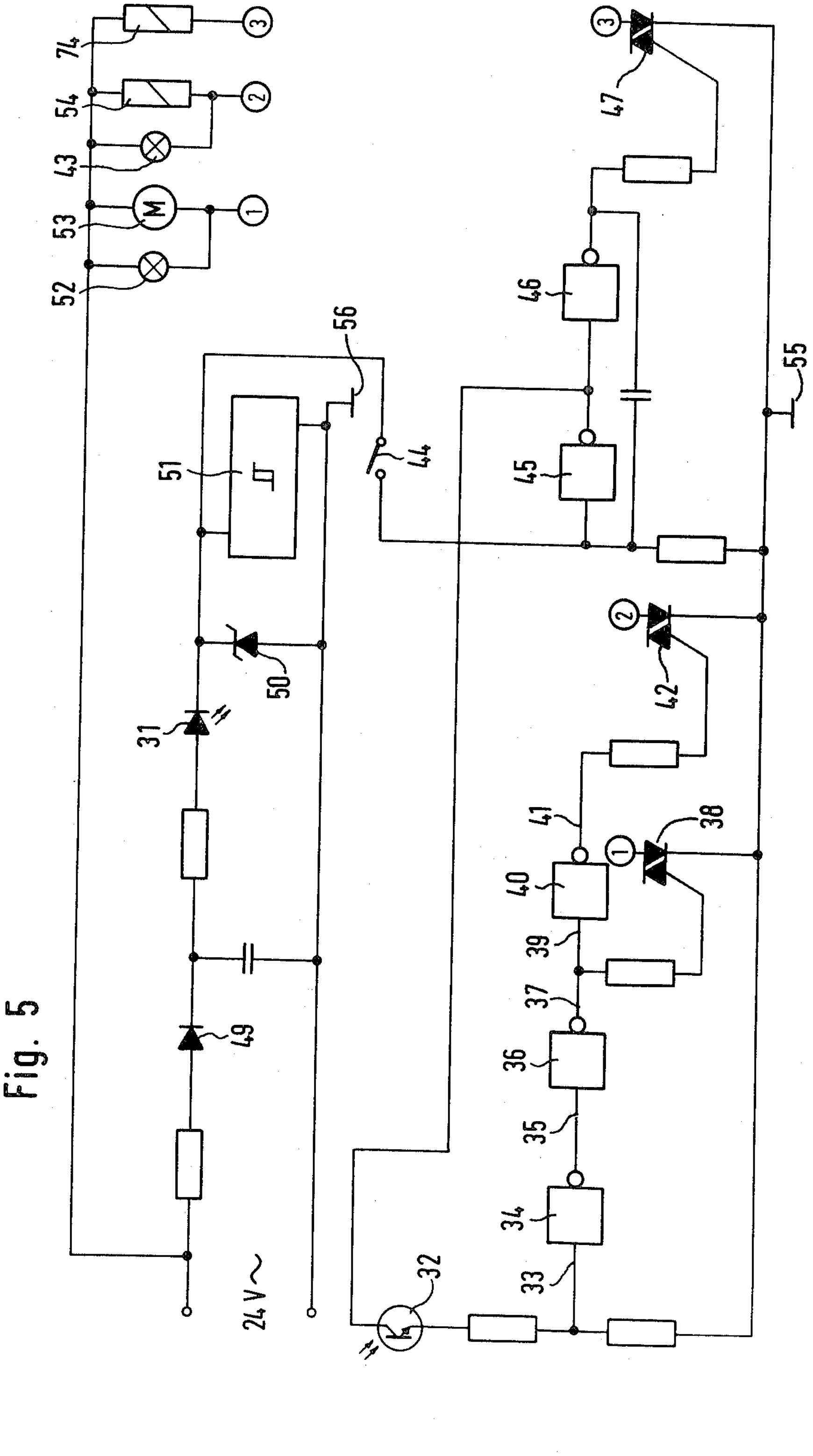
FIG. 5 illustrates the electrical dispensing system in greater detail.

The control system of the automatic vending machine in principle functions as follows:

When a ticket 3 is being fed up to the position of preparedness, B, the light beam from a diode 31 to a photo-transistor 32 is blocked, whereby the input 33 of the circuit 34 is at a so-called zero potential. This means that the input 35 of circuit 36 is at 1- (one-) potential and that the output 37 of circuit 36 is at 0- (or zero-) potential, whereby the triac element 38 will not be triggered, i.e. the circuit controlling the motor 29 of the rotating means 5 is unclosed. Since the output from circuit 36 is connected to the circuit 40, the input 39 of circuit 40 is also zero, meaning that the output 41 of circuit 40 is "one", and the triac element 42 is triggered. This means that the circuit containing the coin blockage of the apparatus and comprising the green lamp 43 is closed, whereby the vending machine is in readiness for coin reception. If a coin is inserted, this is sensed by a coin switch 44 which is closed, causing the input of a circuit 45 to switch over from zero- to 1-potential. The combination of circuits 45 and 46 in this case constitutes a monostable flip-flop having the function of causing an extended "triggering" of the triac 47 in a manner to control the ticket blocking element 14 to remain open for the time taken by the ticket 3 to pass by the same. When the light emitted by the diode 31 to the phototransistor 32 is no longer blocked, the input 34 changes to 1-potential, the input 35 of circuit 36 changes to 0-potential, causing the triac 38 to become trigged, whereby the motor circuit is closed and the motor 29 will rotate the storage container 4 until a new ticket 3 reaches the position B of preparedness. Since the output of circuit 36 is at 1-potential, the input 39 to circuit 40 is at 1-potential and the output 41 of circuit 40 at 0-potential, whereby the triac 42 will remain untrigged, causing the circuit for the coin blockage means 48 will be opened, and as a result the coin-slot will be blocked as long as the motor 29 is rotating, after which the same cycle of operations can be repeated. The circuit diagram depicted in FIG. 5, in addition to the above-mentioned elements, comprises a rectifier diode 49, a 12-volts Zener diode 50, an IC-circuit comprising a Schmidt-trigger 51, a red lamp 52 indicating that the vending machine is not prepared for coin insertion, and a green lamp 43 indicating that the machine is prepared for coin insertion. In addition, the diagrammatically illustrated circuit comprises the motor 29 for driving the storage container 4, the coin-blockage means 54, the ticket blockage means 14 and 55, 56 as well as ground connections.

The inventive principle is not restricted to the construction described hereinbefore but can be varied within the scope of the appended claims. It may be mentioned, however, that the storage container 4 may be of an expendable type, and that the ticket blockage means 14 may be a pivotable lever maintained in a blocking position by a spring 57 and which can be moved away from the blocking position against the action of this spring 57. In the position of preparedness of the tickets 3 a mirror 58 disposed beside the dispensing path 12 is adapted to reflect light from the diode 31 when the position of preparedness is empty.

What is claimed is:

1. An improvement in an automatic lottery ticket vending machine, whereby a rotatable drum (4) is adapted for mixing lottery tickets (3) which, upon ticket purchase, are dispensed one or in a definite number at a time from the machine via a dispensing means (2), characterized in that the drum comprises a separate ticket storage container (4) which is connectable to a guiding means (6) of the dispensing means (2), rotating means (5) for said drum, said guiding means (6) provides a separation path (10) with a ticket-guiding member (9) and which includes a ticket-driving portion (8) which upon rotation of the ticket storage container (4) feeds tickets (3) towards and into the separation path (10), said separation path (10) being adapted to permit discharge of one or a definite number of tickets (3) through an opening (7) and via the dispensing means (2) but prevent other tickets (3) from moving out of the ticket storage container (4).

2. Improvements as claimed in claim 1, wherein the ticket driving portion (8) of the ticket storage container (4) includes at least one ticket driver element (11) adapted upon rotating the container (4) to be movable through said separating path (10) thereby moving one or a definite number of tickets (3) at a time to the opening (7) in said guiding means (6).

3. Improvements as claimed in claim 2 or 1 wherein the guiding member (6) is connected with discharge-path-forming parts (13) for guiding the tickets (3) after their passage through said opening (7), into which discharge-path (12) a latch (14) projects to hold a ticket (3) or a definite number of tickets (3) at a time in a position (B) of preparedness, and adapted, by actuation of a control (15) activated upon the purchase of the ticket(s), to release the ticket(s) (3) disposed in said position of preparedness (B) to dispose this ticket or tickets from the automatic vending machine.

4. Improvements as claimed in claim 3 wherein said discharge-path-forming parts (13) form together a packet (16) accessible for dispensing a ticket (3) or tickets (3) and within which the ticket (3) dispensed takes up a position inclined upward and towards the buyer.

5. Improvements as claimed in claim 1 or 2 wherein the storage container (4) is divided into a ticket containing, sealable ticket storage magazine (17) and adjacent to this magazine a driver portion (8) into which tickets are moved by rotation of the container (4).

6. Improvements as claimed in claim 5 wherein said container (4) has inclined inner walls (18, 19) to feed tickets (3) in one direction when the container (4) is being rotated.

7. Improvements as claimed in claim 6 wherein the container (4) has inclined inner walls (18, 19) having different slopes in order to cause tickets upon rotation of the container (4) to move faster in a driver portion (8) than in a ticket storage magazine (17) disposed adjacent to said driver portion.

8. Improvements as claimed in claim 7 wherein said container (4) is of a non-reuse type and has a bottom (22) with connecting elements (23) for the rotating means (5).

9. Improvements as claimed in claim 1, wherein said container (4) is disposed between said dispensing means (2) and the rotating means (5) for rotation thereof.

10. The improvements as claimed in claim 9, wherein said rotating means (5) keeps said container (4) in engagement with said guiding means (6).

* * * * *